United States Patent
Noguchi

Patent Number: 5,243,542
Date of Patent: Sep. 7, 1993

[54] INTERFEROMETER EMPLOYING REFERENCE IMAGES

[75] Inventor: Masato Noguchi, Kawaguchi, Japan

[73] Assignee: Asahi Kogaku Kogyo Kabushiki Kaisha, Tokyo, Japan

[21] Appl. No.: 704,729

[22] Filed: May 20, 1991

Related U.S. Application Data

[63] Continuation of Ser. No. 291,547, Dec. 29, 1988, abandoned.

[30] Foreign Application Priority Data

Dec. 29, 1987 [JP] Japan .................. 62-335676
Jan. 21, 1988 [JP] Japan .................. 63-11094

[51] Int. Cl.$^5$ ............................ G01B 11/14
[52] U.S. Cl. .................. 364/525; 356/374
[58] Field of Search ............ 364/525, 522; 356/374, 356/343, 347, 349, 357; 382/1, 32, 22, 14

[56] References Cited

U.S. PATENT DOCUMENTS

| | | | |
|---|---|---|---|
| 3,166,624 | 1/1965 | Vargady | 356/374 |
| 4,525,858 | 6/1985 | Cline et al. | 382/1 |
| 4,541,113 | 9/1985 | Soufort et al. | 356/374 |
| 4,794,550 | 12/1988 | Greivenkamp, Jr. | 364/562 |
| 4,836,681 | 6/1989 | Van Saders et al. | 356/374 |
| 4,978,222 | 12/1990 | Drew et al. | 356/374 |

FOREIGN PATENT DOCUMENTS 2157825 10/1985 United Kingdom ............... 356/374

OTHER PUBLICATIONS

Abramson; "The Holo-Diagram. IV: A Practical Device for Simulating Fringe Patterns in Hologram Interferometry"; Applied Optics/vol. 10, No. 9/1971.
Lim et al; "Talbot Interferometer with Computer Generated Gratings"; Optics Communication/vol. 44, No. 4/1983.
Funnell; "Image Processing Applied to Interactive Analysis of Interferometric Fringes"; Applied Optics/vol. 20, No. 18/1981.
Lohmann et al; "Computer Generated Moire"; Optics Communication, vol. 34, No. 2/1980.
*Moire Topography*, by Takasaki, Applied Optics, vol. 9, No. 6, pp. 1467-1472 (Jun., 1970).
*Morie Technique by Means of Digital Image Processing*, by Gasvik, Applied Optics, vol. 22, No. 23, pp. 3543-3548 (Dec. 1, 1983).
*Aspherical Mirrol Testing Using a Quasi Lateral Moving Grading Morie Method*, by Ono Kogaku, vol. 16, No. 4.
*Subfringe Interferometry Fundamentals*, by Takeda, Oct. 6, 1983.

*Primary Examiner*—Jack B. Harvey
*Assistant Examiner*—Ellis B. Ramirez
*Attorney, Agent, or Firm*—Sandler, Greenblum & Bernstein

[57] ABSTRACT

An interferometer for measuring the degree of deformation of an object, wherein alignment detection is facilitated by producing a moire pattern. An image signal data for reference fringes is compounded with interference fringe data that has been used for alignment detection. In generating a moire pattern, the interference fringe image signal data is process using the reference fringe data as a filter, resulting in improvement in visibility of the moire pattern.

21 Claims, 10 Drawing Sheets

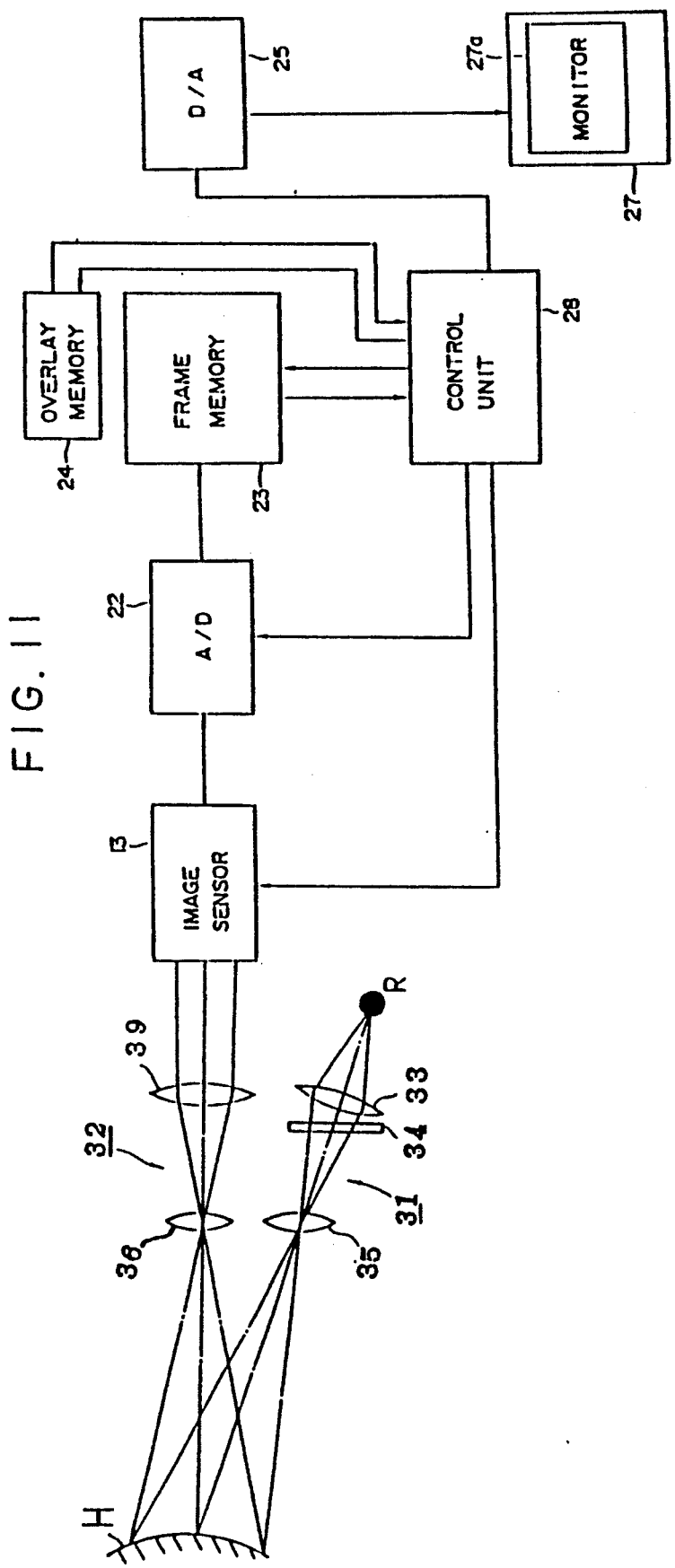

INTERFEROMETER EMPLOYING REFERENCE IMAGES

This application is a continuation of application No. 07/291,547, filed Dec. 29, 1988, now abandoned.

BACKGROUND OF THE INVENTION

This invention relates to an interferometer for measuring deformation or geometry of an object with precision, utilizing the wavelength of light, and more particularly to such an interferometer that is configured to facilitate detection of alignment with a moire pattern displayed on a monitor screen.

An interferometer, as illustrated in FIG. 1, for instance, is used to measure a degree of deformation of an object with precision, utilizing the wavelength of light. In the drawing, numeral 1 indicates a source of laser beam, 2 a relay lens, 3 an imaging lens, 4 a half mirror, 5 a surface to be measured, 6 a reference surface with an adjustable angle, 7 an image sensor receiving interference fringes, and 8 a monitor for displaying interference fringes.

When a laser beam is emitted from the laser beam source 1, it is passed through the relay lens 2 and reaches the half mirror 4 where it is separated into two beam rays. One of the beam rays then reaches the surface 5 to be measured, on which it is reflected and reaches the half mirror 4 again. The other beam ray, separated by the half mirror 4, reaches the reference surface 6, on which it is reflected to reach the half mirror 4 again. The beam ray reflected on the reference surface 6, and that reflected on the surface 5, interfere with each other so that interference fringes are formed on the image sensor 7 through the imaging lens 3. Interference fringes thus appear on the screen of a monitor 8.

When the reference surface 6 is tilted, a number of interference fringes L, as illustrated in FIG. 2, are seen on the monitor 8. The spatial fringe scanning method is applicable to such a case as one of high-precision fringe analyzing algorithms to enable a degree of deformation of an object to be calculated, from such interference fringes L with, utilizing the precision under wavelength of light.

The number of interference fringes L is set at 64 in view of the fringe analyzing algorithm and the number of picture elements on the screen of the monitor 8. Consequently, the tilt angle $\theta$ of the reference surface 6 is adjusted to provide 64 interference fringes for alignment of the interferometer.

In the device as mentioned above, however, alignment of the interferometer can be detected by checking whether the number of interference fringes seen on the monitor 8 is 64 or not, that is, by counting the number of interference fringes on the monitor 8 one by one. The detecting operation has therefore suffered very bothersome and inefficient procedures.

An alternative arrangement has therefore been proposed, wherein an optical grid image is formed on the surface to be measured, which is received by a moire pattern generator to generate a moire pattern that is used to measure deformation of an object. The actual constitution is, for instance, as illustrated in FIG. 3.

The arrangement shown consists of a projection optical system 31 for projecting a grid image onto an object H to be measured and a moire pattern generator 32 which receives the grid image reflected from the object H to generate a moire pattern. The projection optical system 31 consists of a luminous source R, a relay lens 33, a first reference grid 34, and a relay lens 35. The moire pattern generator 32 consists of an objective lens 36, a second reference grid 37, a relay lens 38, an imaging lens 39 and a film F.

When a light is emitted from the light source R, the light passes through the relay lens 33, the first reference grid 34 and the relay lens 35 to reach the object H, where a grid image is formed by means of the first reference grid 34. The reflected grid image then reaches the second reference grid 37 through the objective lens 36 of the moire pattern generator 32. The image of the first reference grid 34, which has been deformed in dependence on the geometry of the object H, is then laid on the second reference grid 37, producing a moire pattern. The moire pattern is developed on the film F by means of the relay lens 38 and the imaging lens 39. The geometry of the object H is thus measured in accordance with the moire pattern formed on the film F.

The moire pattern generator 32 as described above, however, has drawbacks in that, since the second reference grid 37 consists of a substrate having numerous slits, it is difficult to change the number of the slits and their pitch as desired, and that contrast of the moire pattern is undesirably low.

One example proposed to overcome these problems is given by an aspherical surface inspection device such as illustrated in FIG. 4, which has been described in "KOGAKU" Vol. 16, No. 4 (Apr. 1987) published by the Optics Branch of the Society of Applied Physics, in Japan.

A moire fringe image signal generator 49 (FIG. 4) comprises a CCD (Change Coupled Device) 54, a piezo element 55, a microprocessor 56, an image memory 58, a processor 59, and a monitor 60. An interference optical system 50 comprises a laser light source 51, a half mirror M, a reference mirror 53, and a set of relay lenses 64a to 64c. The microprocessor 56 calculates the intensity distributions of interference fringes per phase variation of the reference light by 2/N in accordance with the assumption that a surface of the object 52 to be measured has zero geometrical error. The N distributions of interference fringe intensity are stored, in advance, in N (four in FIG. 4) image memories 58.

When a laser beam is now emitted from the laser light source 51, it is passed through the relay lens 64a to reach the half mirror M where it is separated into two beam rays. One of the beam rays is passed through the relay lens 64b to the object 52, on which it is reflected and reaches the half mirror M via the relay lens 64b again. The other beam ray separated by the half mirror M reaches the reference mirror 53, on which it is reflected to reach the half mirror M again. The laser beam reflected on the reference mirror 53 and that reflected on the object 52 interfere with each other so that interference fringes are formed on the CCD 54 through the relay lens 64c.

The reference mirror 53 is attached to the piezo element 55 so that the phase of the reference light is varied by 2/N (N is an integer) per 1/30 second in synchronism with the timing of image receipt timing at the CCD 54.

The processor 59 serves to operate, for each phase variation of the reference mirror 53, the moire fringe image signals corresponding to the moire pattern generated by the interference between the actual interference fringes formed on the CCD 54 and the virtual computer hologram (interference fringe intensity distribution)

which consists of the reference grid stored in the image memory 58. It then calculates the sum of these moire pattern images to display it on the monitor 8. It is intended to eliminate flickering of the moire pattern or to improve the contrast through such calculation.

Driver 61 drives the piezo element 55, and controller 62 controls the driver 61 and image memory 58.

However, in the device described above, there is a problem in that the piezo element 55 must be used to move the reference mirror 53 in accordance with the wavelength of light, which makes the device complicated in structure and extremely expensive.

SUMMARY OF THE INVENTION

It is therefore an object of the invention to provide an improved interferometer capable of detecting alignment with a simple operation taking advantage of a moire pattern.

Another object of the invention is to provide an improved moire pattern generating system that is less expensive than conventional devices, with minimized deterioration of contrast and other characteristics.

For this purpose, according to this invention, there is provided an interferometer wherein an interference fringe is formed by two reflections, one being a reflection on a surface to be measured, which is shone with a light beam from a point light source, and the other being a reflection on a reference surface to be shone simultaneously with the surface to be measured, the reference surface being constituted to vary phases of said reflection, the interferometer comprising:
- an interference fringe image signal generating means for generating an interference fringe image signal in response to the interference fringe;
- a moire fringe image signal generating means for generating moire fringe image signals based upon the said interference fringe image signals and predetermined reference fringe image signals; and
- a display means for displaying a moire fringe image corresponding to the moire fringe image signals;
- wherein alignment of the interferometer is adjusted by varying the phases of the reflection on the reference surface and is confirmed by a maximum moire pattern cycle.

DESCRIPTION OF THE ACCOMPANYING DRAWINGS

FIG. 11 is a diagram showing the configuration of a system for measuring a geometry of an object according to this invention.

DESCRIPTION OF THE EMBODIMENTS

Figure 1:
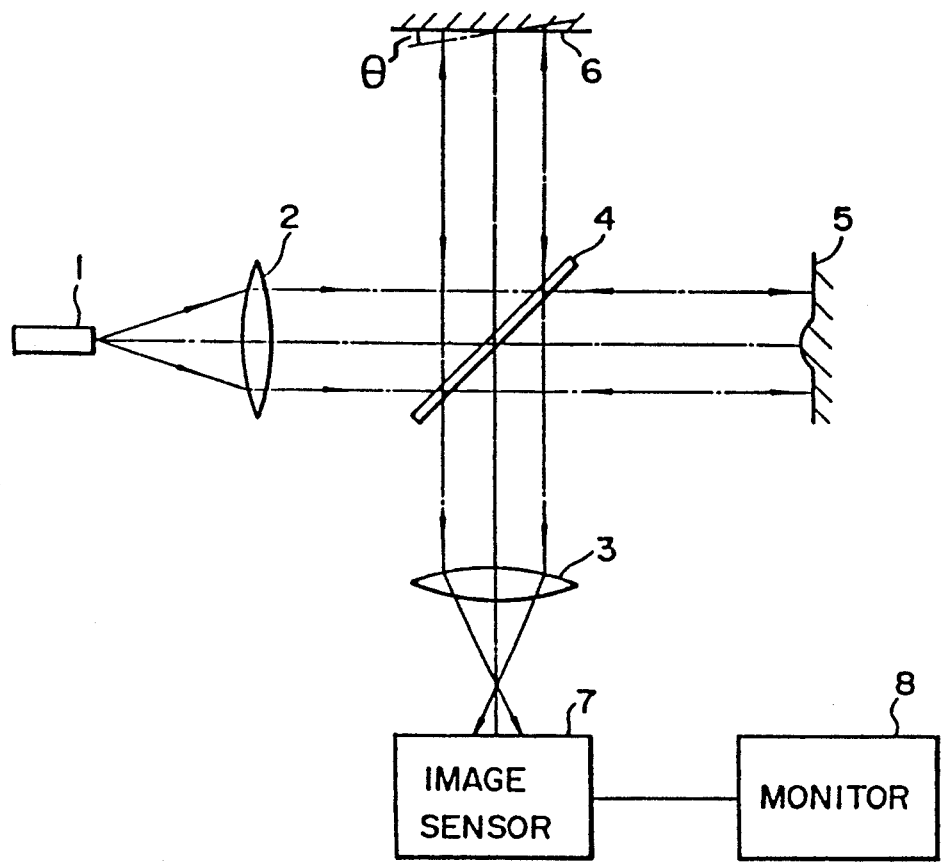
FIG. 1 is a general explanatory view of a conventional interferometer.
Figure 2:
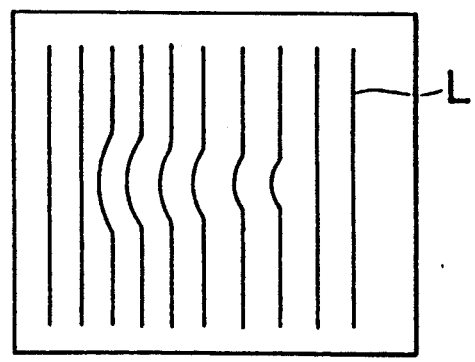
FIG. 2 is an explanatory view showing a sample of a interference fringe pattern.
Figure 5:
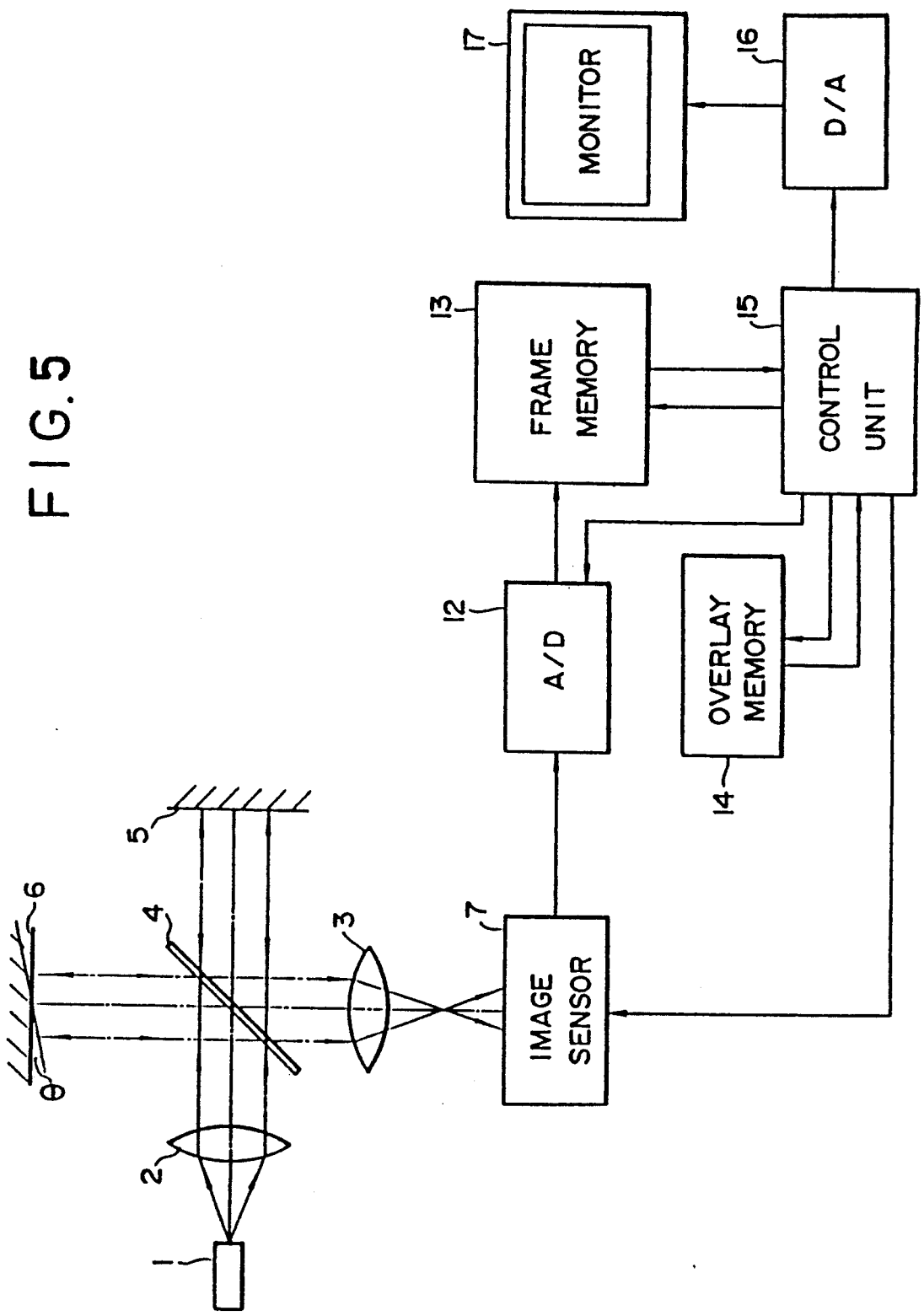
FIG. 5 is a diagram showing the configuration of an interferometer embodying the invention.

FIG. 5 is a block diagram showing constitution of the interferometer embodying the invention. Similar elements to those shown in FIG. 1 are designated by like numerals, with their detailed description omitted.

Figure 8:
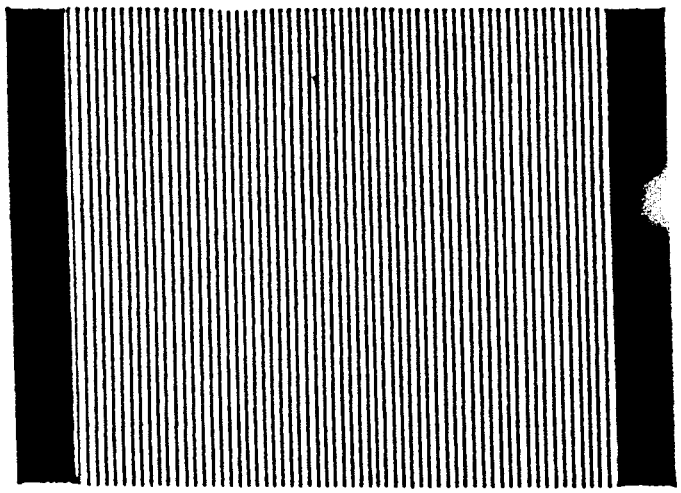
FIG. 8 is an explanatory view showing an example of a reference fringe image signal.

In FIG. 5, an A/D converter 12 converts interference fringe image signals generated by an image sensor 7 sequentially to digital signals for each picture element, while a frame memory 13 stores the interference fringe image signals delivered sequentially from the A/D converter 12 in addresses corresponding to picture elements of the image sensor 7. An overlay memory 14 which contains a 64-cyclic-image of reference fringes as black-level and white-level signals, as shown in FIG. 8. An operation control unit 15 reads out the interference fringe image data stored in the frame memory 13 and the reference fringe image data stored in the overlay memory 14 and lays them on each other to produce a moire pattern signal. The control unit 15 also serves to sequentially take out signal charges corresponding to the image signals accumulated at picture elements of the image sensor 7 and to control operation of the A/D converter 12. A D/A converter 16 converts the moire pattern signal produced by the operating control unit 15 to an analog signal and monitor 17 displays the moire pattern of the moire signal delivered from the D/A converter 16. In the meantime, the "overlay memory 14" means a memory for auxiliary display equipped in a picture memory unit to display characters or the like on input images in overlapped states.

Operation of the above-constructed interferometer is described below.

When a laser beam is emitted from the laser light source 1, it is passed through the relay lens 2 and reaches the half mirror 4 where it is separated into two beam rays. One of the beam rays then reaches the surface 5 to be measured, on which it is reflected and reaches the half mirror 4 again. The other beam ray separated by the half mirror 4 reaches the reference surface 6, on which it is also reflected to reach the half mirror 4. The laser beam reflected on the reference surface 6 and that reflected on the surface 5 interfere with each other so that interference fringes are formed on the image sensor 7 through the imaging lens 3. The image sensor 7 sequentially outputs signal charges (the interference fringe image signals) stored in picture elements, under the control of the operation control unit 15. The A/D converter 12 then converts the interference fringe image signals to digital signals, which are stored in addresses of the frame memory 13 corresponding to the picture elements as interference fringe image signal data.

After the data saving processings described above are completed, the operation control unit 15 reads out in sequence the interference fringe image signal data and the reference fringe image signal data stored in the frame memory 13 and the overlay memory 14, and overlays these image signal data on each other to produce a moire pattern signal. The moire pattern signal is then converted to an analog signal by the D/A converter 16 to be sent to the monitor 17. When the spatial frequency of the interference image signal data does not coincide with that of the reference fringe image signal data, that is, when alignment of the interferometer is not completed, a moire pattern as shown in FIGS. 9A through 9C is displayed on the monitor 17.

Monitoring such a moire pattern, the tilt angle $\theta$ of the reference surface 6 is adjusted to provide the maximum cycle of moire fringes. When the cycle of moire fringes reaches the maximum, the spatial frequency of the interference fringe image signal data coincides with that of the reference fringe image signal data (the number of interference fringes is 64). This means that the moire pattern does no longer appear; that is, alignment of the interferometer is completed.

Figure 9A:
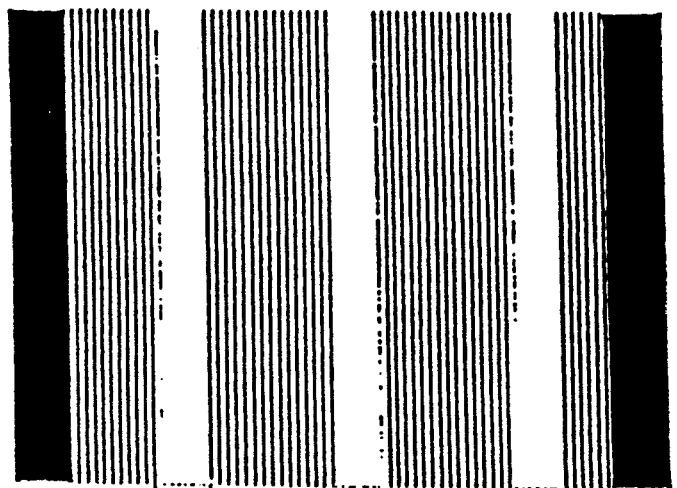
FIGS. 9A through 9C are explanatory views showing how visibility of the moire pattern is improved.
Figure 9B:
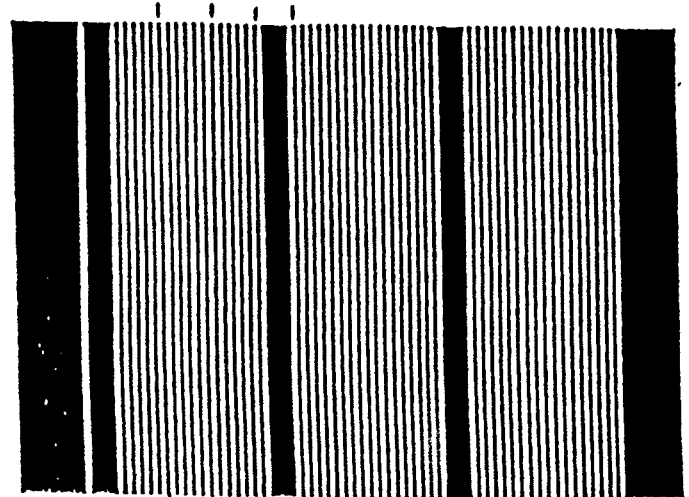
Figure 9C:
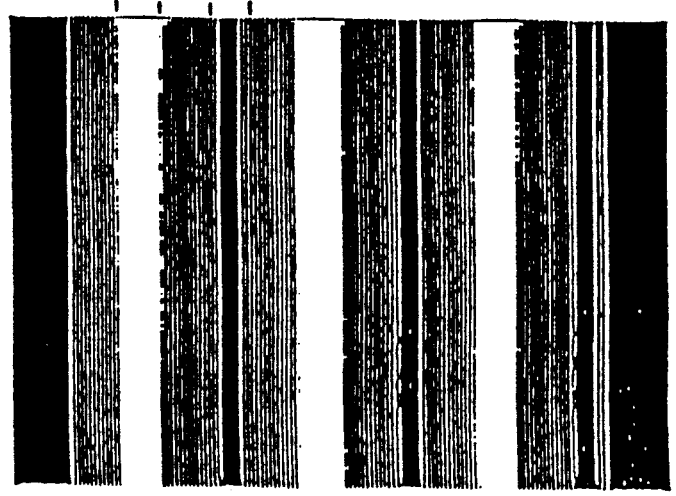
Figure 10:
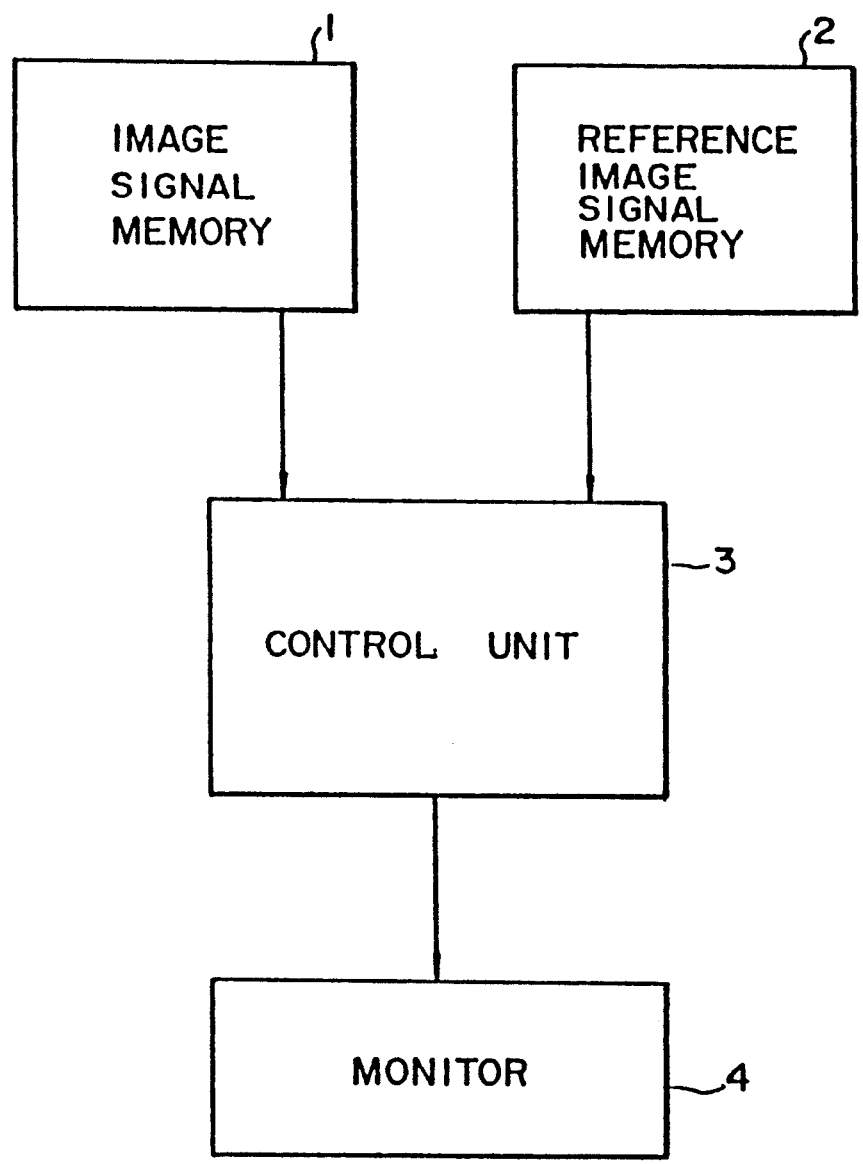
FIG. 10 is a configuration diagram of a moire pattern generator according to this invention.

The diagrams of FIGS. 9A through 9C are given to illustrate the process on how visibility is improved in a way to be described below. Visibility becomes better toward the bottom of the drawing. The relationship between the moire pattern and the alignment detection is described with reference to these diagram as well as FIG. 8.

Despite the difference in visibility, all the diagrams of FIGS. 9A through 9C indicate the case where the reference surface 6 in FIG. 5 is so tilted that the number of fringes of the interference fringe image signal data becomes 61 when the number of fringes of the reference fringe image signal data is 64. In other words, three fringe patterns are seen because there is a difference in spatial frequency between the two image signal data in the number of fringes, that is 3. Adjusting the tilt angle $\theta$ of the reference surface 6 to provide the maximum moire pattern cycle means that the fringe pattern will disappear, allowing the monitor screen to look completely white or black, or to display a uniform-looking picture as shown in FIG. 8. How the screen looks depends on the phase relation between the two image signal data. That is, alignment detection is completed by coincidence of both spatial frequencies, regardless of the actual phase relationship between them. Complete detection of alignment is determined solely by the presence or absence of the moire pattern, not by counting the number of interference fringes one by one, as in conventional interferometers.

Figure 3:
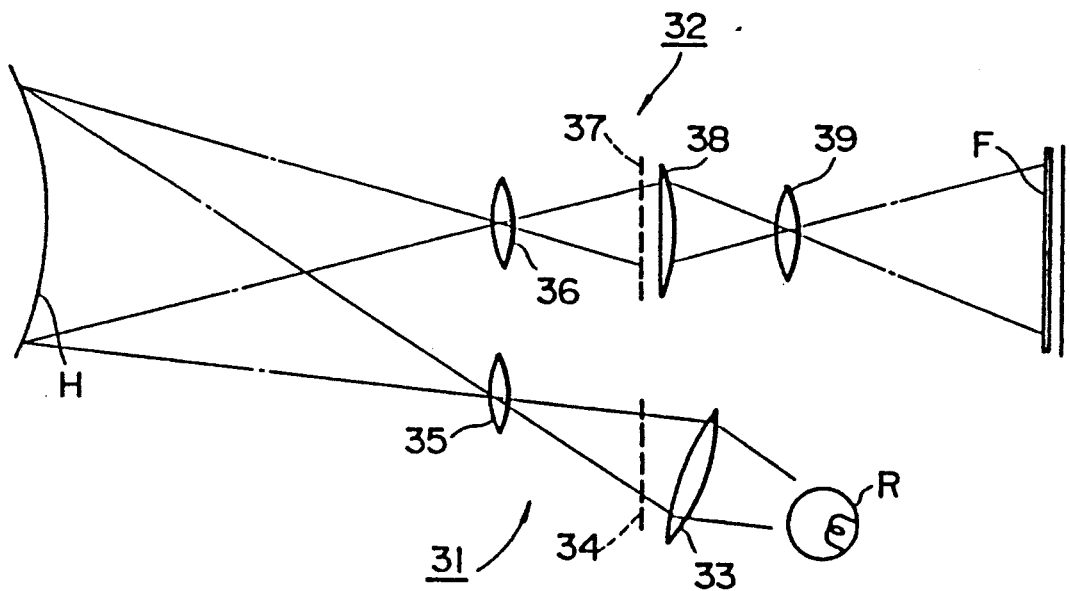
FIGS. 3 and 4 are explanatory views of conventional moire pattern generators.
Figure 4:
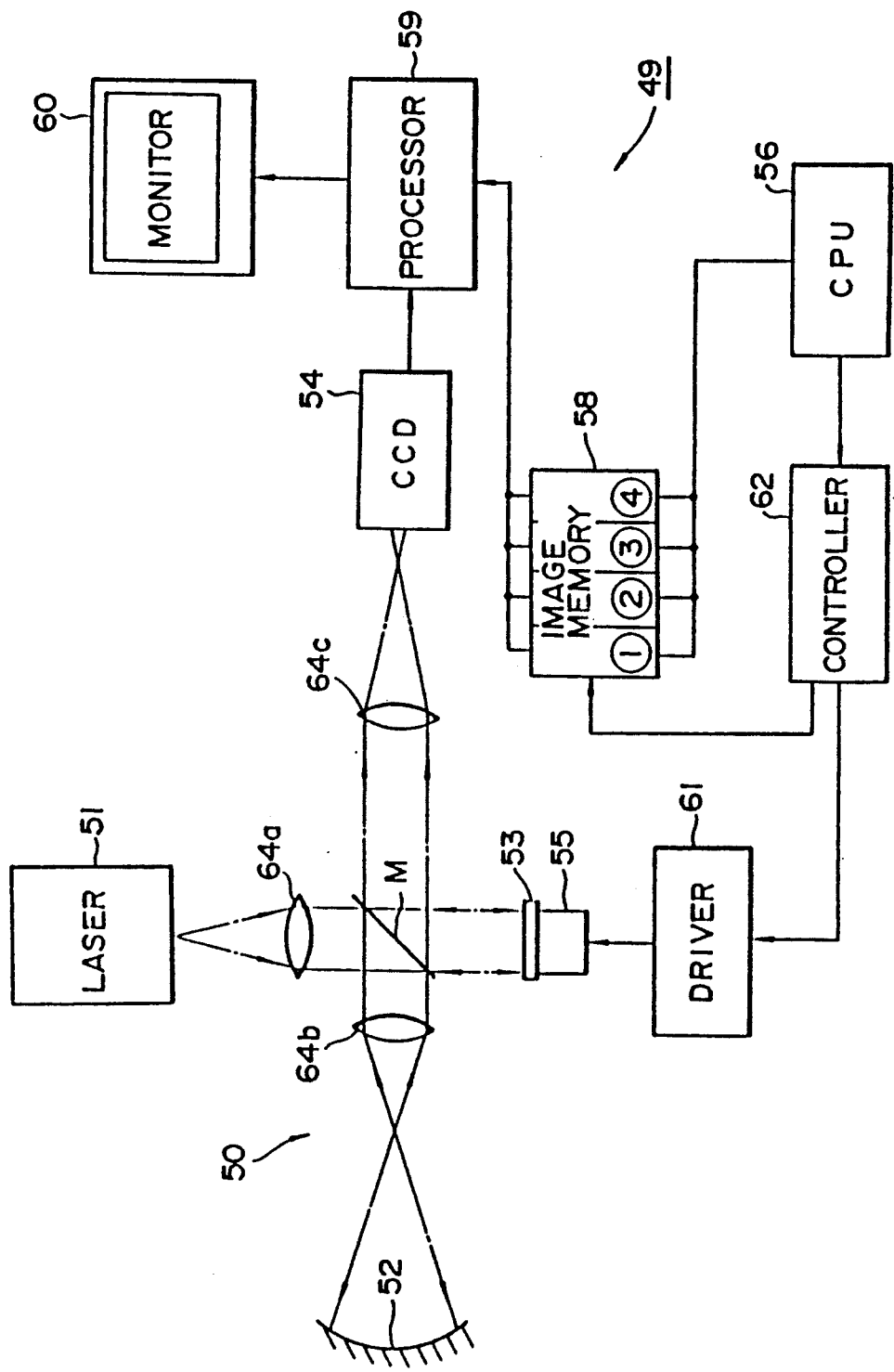
Figure 6:
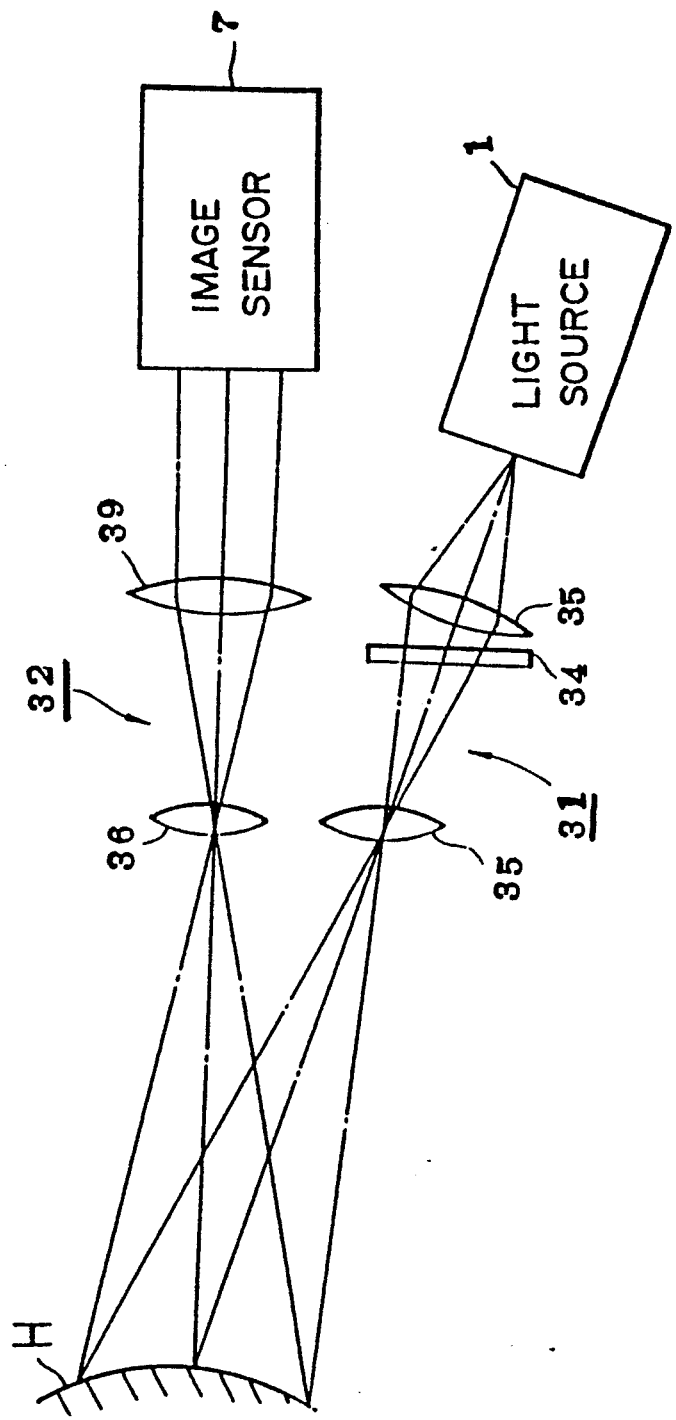
FIG. 6 is a diagram showing a modified optical system to be employed in the interferometer illustrated in FIG. 5.

FIG. 6 shows a modified arrangement of the optical system for the moire pattern generator embodying the invention, which is constructed similar to that shown in FIG. 3.

In FIG. 6, projection optical system 31 produces an interference fringe image on a surface of the object H to be measured, and an imaging optical system 32 develops the interference fringe image reflected from the surface of the object H, on image sensor 7.

The projection optical system 31 consists of a luminous source 1, a relay lens 33, a grid 34, and a relay lens 35, while the imaging optical system 32 comprises an objective lens 36 and a relay lens 39. The grid 34 consists of a substrate provided with numerous slits. The grid 34 and the object H, and the object and the image sensor 7 are in conjugate relation with each other.

A light beam emitted from the source 1 reaches the object H to be measured through the relay lens 33, the grid 34 and the relay lens 35 to form an interference fringe image on the object H. The light beam producing the interference fringe image is reflected on the object H to be passed through the lenses 36 and 39 to the image sensor 7, where the interference fringe image signal is produced.

The technical process for improvement of visibility is now described with reference to FIGS. 7 and 9A through 9C. Each signal data stored in the overlay memory 14 in FIG. 5 usually consists of 1 bit. The reference fringe image signal data to be stored in memory 14 is a binary data, with "0" corresponding to the black level and "1" corresponding to the white level. While on the other hand, the interference fringe image signal data is a multi-value data, it is assumed to be a binary data, "0" or "1", for convenience of explanation.

Figure 7:
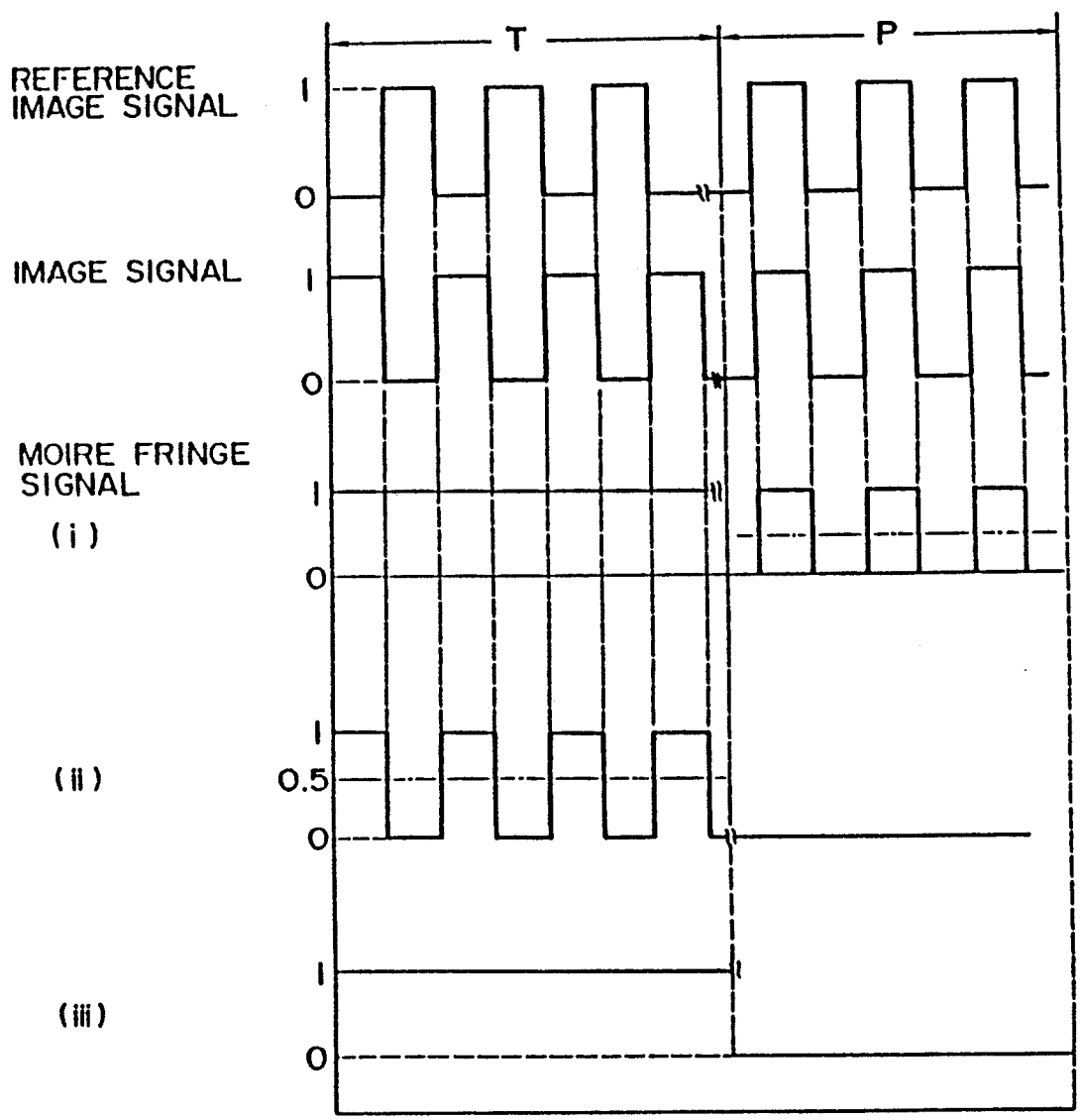
FIG. 7 is an explanatory view showing a phase relation between signals to be compounded for generating moire pattern and resulting moire pattern signals.

Referring to FIG. 7, the reference fringe image signal data is phased inversely to the interference fringe image signal data over the bright section T, while over the dark section P, the phases of both data coincide with each other. In FIG. 7, (i), (ii) and (iii) indicate the intensity of the moire pattern signals corresponding to the moire pattern shown in FIGS. 9A through 9C in terms of the bright and dark areas. The process of compounding the reference fringe image signal data and the interference fringe image signal data and its concrete example are described.

Assuming the reference fringe image signal data to be a filter, the data is denoted by F. With the interference fringe image signal data denoted by X, X is inverted to be output as an output signal data Y, depending on the state of F. FIG. 9A indicates the case where F and X are compounded as they are, producing a moire pattern signal shown in FIG. 7(i). When F=0 X is output as it is, while X is always 1 when F=1. This is expressed by the equation:

$$Y_{F=0}=X, Y_{F=1}=1$$

A signal intensity Imax. at the bright area is equal to 1, as is apparent from FIG. 7(i).

$$I\min. = \frac{1}{2\pi}\left(\int_0^\pi 1 dt + \int_\pi^{2\pi} 0 dt\right)$$

$$= \frac{1}{2}$$

Accordingly, visibility V1 in the state of (i) is given by $$V_1 = \frac{I\max - I\min}{I\max + I\min} = \frac{\left(\frac{1}{2}\right)}{\left(\frac{3}{2}\right)} = \frac{1}{3}$$

As for the case of FIG. 9B, while the phase relation of input signals is the same as in (i), X is output as it is when F=0, while X is always 0 when F=1. This is expressed by the equation:

$$Y_{F=0}=X, Y_{F=1}=0$$

At this time, the moire pattern signal as shown in FIG. 7(ii) is provided.

The signal intensity Imax. at bright area in this state is calculated in the same way as for the case of dark area in state (i) so that Imax.=½, while Imin., the signal intensity at the dark area is 0. Visibility V2 in state (ii) is therefore expressed by $$V_2 = \frac{Imax - Imin}{Imax + Imin} = 1$$

which is the maximum value.

As for the case of FIG. 9C, while the phase relation between input signals is the same as in (i) and (ii), X is output as it is when F=0, and X is inverted when F=1.

This is expressed by the equation:

$$Y_{F=0} = X, Y_{F=1} = \overline{X}$$

so that the moire pattern signal shown in FIG. 7(iii) is given. In this state, Imax.=1, and Imin.=0.

Visibility V3 in state (iii) is therefore $$V_3 = \frac{Imax. - Imin.}{Imax. + Imin.} = 1$$

which is the maximum value. Since the signal intensity at the bright area is also 1, a clear-to-see moire pattern is obtained.

The procedures described above can be tabulated as follows:

|   | max. intensity Imax. | min. intensity Imin. | in./out. relation | visibility V |
|---|---|---|---|---|
| i) | 1 | ½ | $Y_{F=0} = X$ $Y_{F=1} = 1$ | ⅓ |
| (ii) | ½ | 0 | $Y_{F=0} = X$ $Y_{F=1} = 0$ | 1 |
| (iii) | 1 | 0 | $Y_{F=0} = X$ $Y_{F=1} = \overline{X}$ | 1 |

As fully described, alignment detection in an interferometer can be facilitated by producing a moire pattern. A major feature of the interferometer according to the invention is that it provides a reference fringe image signal data for generating a moire pattern. Furthermore, to improve visibility of the moire pattern, it is possible to process the interference fringe image signal data in accordance with the reference fringe image signal data.

It is obviously understood that the moire generator according to the invention is applicable not only to interferometers but also to other different devices including an aspherical surface inspection device and a device for measuring geometry or degree of deformation of an object. Although the reference fringe image signal data is stored in the overlay memory in the embodiment described, it can be stored in any other suitable picture memory.

What is claimed is:

1. A moire fringe generating system, comprising:
   means for outputting comparing fringe image signals;
   an image memory having stored therein electrical reference fringe image signal data comprised of black level signal data and white level signal data; and
   means for generating moire fringe image signals based upon an electrical signal combining of said comparing fringe image signals and said electrical reference fringe image signal data;
   wherein said moire fringe image signal generating means generates said moire fringe image signals by outputting said comparing fringe image signals as it does when said electrical reference fringe image signal data is a black level, while outputting a black level signal when said electrical reference fringe image signal data is a white level.

2. A moire fringe generating system, comprising:
   means for outputting comparing fringe image signals;
   an image memory having stored therein electrical reference fringe image signal data comprised of black level signal data and white level signal data; and
   means for generating moire fringe image signals based upon an electrical signal combining of said comparing fringe image signals and said electrical reference fringe image signal data;
   wherein said moire fringe image signal generating means generates said moire fringe image signals by outputting said comparing fringe image signals as it does when said electrical reference fringe image signal data is a black level, while outputting a converted level data signal of said comparing fringe image signal when said electrical reference fringe image signal data is a white level.

3. A moire pattern generating system for an interferometer, comprising:
   means for detecting a surface fringe pattern;
   means for providing a reference fringe pattern; and
   means for electrically combining an electrical signal representing said reference fringe pattern with a signal representing said surface fringe pattern to form a signal representing a moire pattern.

4. The system of claim 3, further comprising means for displaying said moire pattern.

5. The system of claim 4, wherein said display means comprises a monitor.

6. An interferometer in which an interference fringe is formed by two reflections, one of said reflections being a reflection on a surface to be measured, the other of said reflections being a reflection from a reference surface, said interferometer further comprising:
   means for generating an interference fringe image;
   means for generating a moire pattern from said interference fringe image and a predetermined reference fringe image by electrically combining an electrical signal representing said interference fringe image with a signal representing said predetermined reference fringe image; and
   means for displaying said moire pattern, a phase of said moire pattern indicating whether said reference surface is adjusted in a predetermined plane.

7. The system of claim 3, wherein an alignment of said interferometer is adjusted by varying a phase of a reflection on a reference surface of said interferometer, said interferometer being properly aligned when said moire pattern is a maximum moire fringe pattern cycle.

8. A moire pattern generating system, comprising:
   means for generating interference fringe image signals in response to an interference fringe, said interference fringe being formed by two reflections, one reflection being a reflection on a surface to be measured which is illuminated with a light beam from a point light source, a second reflection being a reflection from a reference surface to be illuminated simultaneously with said surface to be measured, said reference surface being constructed to vary a phase of said reflection;
   means for providing a reference fringe pattern; and
   means for electrically combining an electrical signal representing said reference fringe pattern with a signal representing a pattern corresponding to sad interference fringe so as to form a moire pattern, wherein an alignment of said moire pattern generating system is adjusted by varying said phase of said reflection surface and is confirmed by a maximum moire fringe cycle.

9. The moire pattern generating system of claim 8, wherein said reference fringe pattern comprises black level signals and white level signals, said electrically combining means comprising means for generating said moire pattern by compounding said interference fringe image signal and said reference fringe pattern in such a fashion that said interference fringe image signal is outputted as it is when said reference fringe pattern is a black level signal, while a black level signal is outputted when said reference fringe pattern is a white level signal.

10. The moire pattern generating system of claim 8, wherein said reference fringe pattern comprises black level signals and white level signals, said electrically combining means comprising means for generating said moire pattern by compounding said interference fringe image signal and said reference fringe pattern in such a fashion that said interference fringe image signal is outputted as it is when said reference fringe pattern is a black level signal, while a converted level signal of said interference fringe image signal is outputted when said reference fringe pattern is a white level signal.

11. The moire pattern generating system of claim 8, further comprising a half mirror for separating said light beam from said point light source into two beams and directing said two beams toward said surface to be measured and said reference surface, respectively.

12. The moire pattern generating system of claim 8, wherein the phase of said light beam reflected by sad reference surface is adapted to be varied by tilting said reference surface about a point at which the optical axis of the incident light beam intersects said reference surface.

13. The moire pattern generating system of claim 8, wherein said point light source comprises a laser beam light source.

14. The moire pattern generating system of claim 8, wherein said interference fringe image signal generating means comprises a CCD sensor and an A/D converter.

15. The moire pattern generating system of claim 8, wherein said electrically combining means includes an overlay memory for storing reference fringe image signal data.

16. A system for measuring a geometry of an object by utilizing a moire fringe image generated in response to the geometry of said object, said system comprising:
a light source for illuminating said object;
means for forming an original fringe optical image by passing a light beam emitted from said light source through said image, said original fringe optical image being projected onto said object;
comparing fringe image signal generating means for generating fringe image signals in response to light reflected by said object;
means for providing a reference fringe pattern; and
means for electrically combining an electrical signal representing said reference fringe pattern with a signal representing a pattern corresponding to said fringe image signals generated by said comparing fringe image signal generating means to form a moire pattern.

17. The system of claim 16, wherein said reference fringe image pattern comprises black level signals and white level signals, said electrically combining means comprising means for generating said moire fringe pattern by comparing said comparing fringe image signal and said reference fringe image pattern in such a fashion that said comparing fringe image signals are outputted as when said reference fringe image pattern data is a black level signal, while a black level signal is outputted when said reference fringe image pattern is a white level signal.

18. The system of claim 16, wherein said reference fringe image pattern comprises black level signals and white level signals, said electrically combining means comprising means for generating said moire fringe pattern by comparing said comparing fringe image signal and said reference fringe image pattern in such a fashion that said comparing fringe image pattern are outputted as when said reference fringe image pattern data is a black level signal, while a converted level signal of said comparing fringe image pattern is outputted when said reference fringe image pattern is a white level signal.

19. A moire pattern generating system, comprising:
means for generating an interference fringe image in response to an interference fringe, said interference fringe being formed by two reflections, one reflection being a reflection on a surface to be measured which is illuminated with a light beam from a light source, a second reflection being a reflection from a reference surface to be illuminated simultaneously with said surface to be measured, said reference surface being constructed to vary a phase of said reflection;
means for providing a reference fringe pattern; and
means for superimposing said reference fringe pattern with a pattern corresponding to said interference fringe so as to form a moire pattern, wherein an alignment of said moire pattern generating system is adjusted by varying said phase of said reflection surface and is confirmed by a maximum moire fringe cycle.

20. The moire pattern generating system of claim 19, further comprising means for displaying said moire pattern.

21. The moire pattern generating system of claim 20, wherein said display means comprises a monitor.

* * * * *

UNITED STATES PATENT AND TRADEMARK OFFICE
CERTIFICATE OF CORRECTION

PATENT NO. : 5,243,542
DATED : September 7, 1993
INVENTOR(S) : M. NOGUCHI

It is certified that error appears in the above-indentified patent and that said Letters Patent is hereby corrected as shown below:

At column 8, lines 41 and 42 (claim 6, lines 9 and 10) of the printed patent, "an electrical signal" should be changed to ---a signal---.

At column 8, line 43 (claim 6, line 11) of the printed patent, "a signal" should be changed to ---an electrical signal---.

At column 8, line 67 (claim 8, line 15) of the printed patent, "sad" should be changed to ---said---.

At column 9, line 34 (claim 12, line 2) of the printed patent, "sad" should be changed to ---said---.

Signed and Sealed this

Twelfth Day of November, 1996

Attest:

*Attesting Officer*

BRUCE LEHMAN

*Commissioner of Patents and Trademarks*